UNITED STATES PATENT OFFICE.

JOHN F. KELLY, OF PITTSFIELD, MASSACHUSETTS.

DESICCATING FOOD.

1,393,540.  Specification of Letters Patent.  Patented Oct. 11, 1921.

No Drawing.  Application filed August 4, 1919. Serial No. 315,297.

*To all whom it may concern:*

Be it known that I, JOHN F. KELLY, a citizen of the United States, residing at Pittsfield, in the county of Berkshire and State of Massachusetts, have invented certain new and useful Improvements in Desiccating Foods, of which the following is a specification.

This invention relates to desiccating foods; and it comprises a method of desiccating fruits, vegetables, etc., wherein the material prior to the desiccation proper is moistened or treated with a solution containing reducing sugars and is thereafter desiccated; all as more fully hereinafter set forth and as claimed.

Fruits and vegetables of course contain very many constituents and in part these substances are sensitive to the action of air. As long as a fruit, such as an apple, is intact air does not readily gain access to the tissues or affect them but as soon as the skin is broken air begins to act and discoloration is usually produced. The action of iron from cutting tools facilitates and accelerates this discoloration but is not necessary to it. The same discoloring action by the action of air, though in less degree, occurs with very many other raw vegetable products such as potatoes. A potato if sliced and then dried in the raw state is apt to discolor more or less, giving a dark product. On rehydrating by treating with water a material is obtained which is different in color and appearance from the original potato and on cooking does not give a cooked product like that made from raw potatoes. It is usually believed that this discoloring action of the air on vegetable constituents is, at least in part, due to the presence of what are known as enzyms; unorganized vegetable ferments. All vegetable tissues contain these enzyms and in part they are oxygen transferring or oxidizing enzyms or "laccases." They are readily destroyed by a high heat. If, for example, a potato be boiled or parboiled prior to slicing and drying, it does not darken up in drying in the manner described; but in so operating desiccated raw potato cannot of course be made. The dried material is dried cooked potato and it cannot be recooked like raw potato.

It has been found that discoloration may be prevented in other ways than by cooking, as for instance by the use of various chemicals which "poison" the enzyms and prevent their exerting their normal activity. But the use of these chemical materials in edible products is of course inadmissible or undesirable.

I have found that I can accomplish the desired end in another manner which consists in providing a very small amount of reducing sugar on the surfaces of the fruit or vegetable during the drying operation. The sugars are of course edible materials and their presence in no way harms the food. In the presence of a reducing sugar the activity of the oxidizing enzym appears to be diverted from the natural constituents of the fruit or vegetable which will discolor under its action. Perhaps the action is then the oxidation of the reducing sugar; this oxidation not being attended with the production of dark products. At all events, in the presence of a reducing sugar the discoloration of the raw fruit or vegetable which normally takes place in drying does not occur.

In practical embodiments of my invention I immerse the cut or sliced fruit or vegetable in a dilute solution of a reducing sugar or of material containing the same. Ordinary glucose or corn sugar solutions will serve. A better preparation is made by mixing cane or beet sugar, such as ordinary loaf sugar, with a little acid. The action of the acid is to convert or "invert" the sucrose into reducing sugars (dextrose and levulose); and the amount of acid required for this purpose is so infinitesimal as to be unimportant. I find it a useful expedient to employ a little alcohol in making the solution of reducing sugars to be used as it then wets and spreads better on the cut surfaces of the fruit or vegetable. A good composition for the present purposes may be made by taking a 10 per cent. solution of cane sugar and adding a little alcohol and any convenient acid to it. 1 or 2 parts of citric acid to 200 parts of water, 20 parts of loaf sugar and 20 parts of alcohol make a good stock solution which can be further diluted; say to a solution containing 0.10 per cent. sugar. When using citric acid which does not have a strong inverting or converting action on sugar in the cold, the stock solution is best boiled for a time. By using stronger acids such as nitric or hydrochloric acid the action on the sugar, or what is termed inversion can be accomplished in the cold. Using hydrochloric acid it may be simply added to the solution in the cold and the solution allowed to stand a few hours, say 3 or 4 hours. A little bicarbonate of soda can be added to convert the acid into ordinary salt.

In drying potatoes the raw potato may be sliced or cut in any of the ordinary ways and then dipped into the solution, drained and dried in any of the usual ways and with any of the usual apparatus. The amount of sugar required to accomplish my purpose is almost infinitesimal being no more than about a tenth or hundredth part for 100 parts of raw potato. The same solution may be used for apples, carrots, turnips, etc., and in the same way.

Other reducing materials normally found in food products may be substituted for these sugars, as for instance, cream of tartar, but they offer no special advantage over reducing sugars. I find however that reducing vegetable acid materials like citric acid, tartaric acid, cream of tartar, (acid potassium tartrate,) etc., are excellent additions to solutions of reducing sugars. Used alone their action is probably that of forming reducing sugars in small amounts from various carbohydrate components of the cut vegetable surfaces such as starch.

What I claim is:—

1. In the desiccation of raw succulent vegetable and fruit products the process which comprises applying a solution containing a reducing sugar to cut surfaces and thereafter desiccating in the usual way.

2. In the desiccation of raw succulent vegetable and fruit products the process which comprises applying a solution containing a reducing sugar and also containing a vegetable acid material of reducing nature to cut surfaces and thereafter desiccating in the usual way.

In testimony whereof, I affix my signature hereto.

JOHN F. KELLY.

Witnesses:
JOHN EAGHAN KELLY,
S. A. O'DANIEL.